US011099964B2

(12) United States Patent
Gresham et al.

(10) Patent No.: US 11,099,964 B2
(45) Date of Patent: Aug. 24, 2021

(54) FRAMEWORK ACTUATOR INTEGRATION

(71) Applicant: Pivotal Software, Inc., San Francisco, CA (US)

(72) Inventors: Michael Gresham, Emeryville, CA (US); Joseph Benjamin Hale, Corte Madera, CA (US)

(73) Assignee: Pivotal Software, Inc., San Francisco, CA (US)

( * ) Notice: Subject to any disclaimer, the term of this patent is extended or adjusted under 35 U.S.C. 154(b) by 299 days.

(21) Appl. No.: 16/198,066

(22) Filed: Nov. 21, 2018

(65) Prior Publication Data
US 2019/0187865 A1 Jun. 20, 2019

Related U.S. Application Data

(60) Provisional application No. 62/608,544, filed on Dec. 20, 2017.

(51) Int. Cl.
| | |
|---|---|
| H04L 29/06 | (2006.01) |
| G06F 11/34 | (2006.01) |
| G06F 11/30 | (2006.01) |
| G06F 9/48 | (2006.01) |
| H04L 29/14 | (2006.01) |
| H04L 29/08 | (2006.01) |
| G06F 9/445 | (2018.01) |

(Continued)

(52) U.S. Cl.
CPC ........ *G06F 11/3409* (2013.01); *G06F 3/0482* (2013.01); *G06F 9/445* (2013.01); *G06F 9/451* (2018.02); *G06F 9/4843* (2013.01); *G06F 11/3006* (2013.01); *H04L 63/0853* (2013.01); *H04L 63/102* (2013.01); *H04L 67/10* (2013.01); *H04L 69/40* (2013.01)

(58) Field of Classification Search
CPC ..... G06F 11/3409; G06F 9/451; H04L 63/102
See application file for complete search history.

(56) References Cited

U.S. PATENT DOCUMENTS

| 8,997,078 B2 | 3/2015 | Spivak et al. |
| 9,071,522 B2 | 6/2015 | Lucovsky et al. |

(Continued)

OTHER PUBLICATIONS

U.S. Appl. No. 16/206,865, filed Jun. 20, 2019, Alston et al.

(Continued)

*Primary Examiner* — Wasika Nipa
(74) *Attorney, Agent, or Firm* — Fish & Richardson P.C.

(57) ABSTRACT

Methods, systems, and apparatus, including computer programs encoded on computer storage media, for restricting user access to actuators and generating user interface presentations that include data received from the actuators when the user has access. One of the methods includes receiving, by an applications manager component of an application platform in a cloud computing environment, a request by a user to access application information of an application deployed by an application framework installed on the application platform in the cloud computing environment. The application framework determines, using a token obtained for the user, that the user has permission to access one or more actuators of the application. The application framework generates a data element for the particular actuator and provides the data element for the particular actuator to the applications manager component. The applications manager component generates a user interface presentation that includes the data element.

20 Claims, 12 Drawing Sheets

(51) Int. Cl.
G06F 9/451 (2018.01)
G06F 3/0482 (2013.01)

(56) References Cited

U.S. PATENT DOCUMENTS

| | | | |
|---|---|---|---|
| 9,274,758 | B1 | 3/2016 | Qin et al. |
| 2011/0265081 | A1 | 10/2011 | Lucovsky et al. |
| 2012/0072555 | A1 | 3/2012 | Deluca et al. |
| 2014/0052867 | A1* | 2/2014 | Lucovsky ............ H04L 63/0245 709/226 |
| 2015/0120939 | A1 | 4/2015 | Islam et al. |
| 2018/0048716 | A1 | 2/2018 | Madhayyan et al. |
| 2018/0285165 | A1 | 10/2018 | Helsley |
| 2018/0287951 | A1* | 10/2018 | Waskiewicz, Jr. .......................... H04L 67/1097 |
| 2018/0324203 | A1 | 11/2018 | Estes et al. |
| 2019/0065277 | A1 | 2/2019 | Raikov et al. |
| 2019/0188107 | A1 | 6/2019 | Alston et al. |

OTHER PUBLICATIONS

AppDynamics [online], "Application Performance Monitoring & Management," available on or before Oct. 16, 2018, via Internet Archive: Wayback Machine URL <https://web.archive.org/web/20181016153208/https://www.appdynamics.com/>, [retrieved on Nov. 14, 2018], retrieved from: URL <https://www.appdynamics.com/>, 9 pages.
DataDog [online], "Modern Monitoring & Analytics," available on or before Nov. 11, 2018, via Internet Archive: Wayback Machine URL <https://web.archive.org/web/20181111043724/https://www.datadoghq.com/> [retrieved on Nov. 14, 2018], retrieved from: URL <https://www.datadoghq.com/>, 3 pages.
New Relic [online], "Real-Time Insights for Modern Software," available on or before Nov. 1, 2018, via Internet Archive: Wayback Machine URL <https://web.archive.org/web/20181110010129/https://newrelic.com/>, [retrieved on Nov. 14, 2018], retrieved from: URL <https://newrelic.com/>, 9 pages.
Prometheus [online], "From Metrics to Insight," available on or before Dec. 19, 2017, via Internet Archive: Wayback Machine URL <https://web.archive.org/web/20171219031415/https://prometheus.io/>, [retrieved on Nov. 14, 2018], retrieved from: URL <https://prometheus.io/>, 4 pages.
"Rodenas ""Docker Service Broker for Cloud Foundry,"" posted at <https://tanzu.vnnware.conn/content/blog/docker-service-broker-for-cloud-foundry>, Aug. 2014, 13 pages".

* cited by examiner

FRAMEWORK ACTUATOR INTEGRATION

CROSS REFERENCE TO RELATED APPLICATIONS

This application claims the benefit under 35 U.S.C. § 119(e) of the filing date of U.S. Patent Application No. 62/608,544, filed Dec. 20, 2017, entitled "FRAMEWORK FOR MANAGING CLOUD COMPUTING PLATFORMS," the entire contents of which are hereby incorporated by reference.

BACKGROUND

This specification relates to cloud computing platforms, and more particularly to integrated application platforms.

A platform-as-a-service ("Paas") system is a cloud computing system that allows users to deploy and manage multiple instances of network-accessible applications, which may also be referred to as web applications. In other words, users of the platform need not spend building or configuring cloud computing systems. Rather, the users can focus on the application development itself, and rely on the services provided by the platform system to launch and manage the application instances.

An application framework is a suite of software tools for accelerating the development of an application. An application framework can receive a definition of an application and can build a deployable application by automatically adding features relating to resource management, exception handling, cross-cutting features, and transaction management, to name just a few examples. Examples of application frameworks include Spring and Steeltoe, which are trademarks of Pivotal Software, Inc.

One capability that can be provided by an application framework is framework actuators, or for brevity, actuators. An actuator is an application-framework-supplied capability that is automatically added to an application and that provides an interface for monitoring and interacting with the application. In this specification, an actuator interface will also be referred to as an actuator end-point. The end-point can be a URL, an API, a command-line command, or a standalone utility program.

Application frameworks that run on top of an application platform typically do not have visibility into the permissions model of the underlying application platform. In other words, the credentials that a user provides to log onto and use the application platform are not visible by an application framework running on the application platform. Therefore, an application framework typically cannot determine if a user of the application platform is authorized to use certain services provided by the application framework.

SUMMARY

This specification describes methods, systems, and computer-readable media that restricts user access to actuators and generates user interface presentations that include data received from the actuators when the user has access. An applications manager component of an application platform in a cloud computing environment receives a request by a user to access application information of an application deployed by an application framework installed on the application platform in the cloud computing environment. The applications manager component obtains, from a user authentication module, a token for the user. The applications manager component provides, to the application framework, the token obtained for the user. The application framework determines, using the token obtained for the user, that the user has permission to access one or more actuators of the application deployed by the application framework. In response, the application framework provides, to the applications manager component, an indication that the user has permission to access the one or more actuators of the application deployed by the application framework. The applications manager provides, to the application framework, a request for data for a particular actuator of the one or more actuators that the user has permission to access. The application framework generates one or more data elements for the particular actuator and provides the one or more data elements for the particular actuator to the applications manager component. The applications manager component generates a user interface presentation that includes the one or more data elements for the particular actuator of the application deployed by the application framework.

Particular embodiments of the subject matter described in this specification can be implemented to realize one or more of the following advantages. The disclosed techniques improve upon conventional authentication systems by providing a more secure authentication system, where system privileges do not need to accompany an authentication token. Sensitive components of a system, e.g., a cloud controller, may authenticate a user action separately, preventing the privileges to access the sensitive components from being mingled with application-level authentication. The commingling of the authorities for the application's own behavior and the authorities for reconciling with cloud controller permissions in a conventional system is avoided.

Using these unconventional authentication techniques, rich data related to the functioning, e.g., health and performance, of an application can be obtained securely and presented in user interface presentations. The user interfaces also enable users to interact with applications securely, e.g., to adjust the log levels of loggers of the applications in real time without disruption to the application. Other unconventional user interface presentations described herein provide a diagnostic tool using the information received securely from actuators of the application, for example, by providing a mapping of endpoints to methods used to respond to requests for the endpoints.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
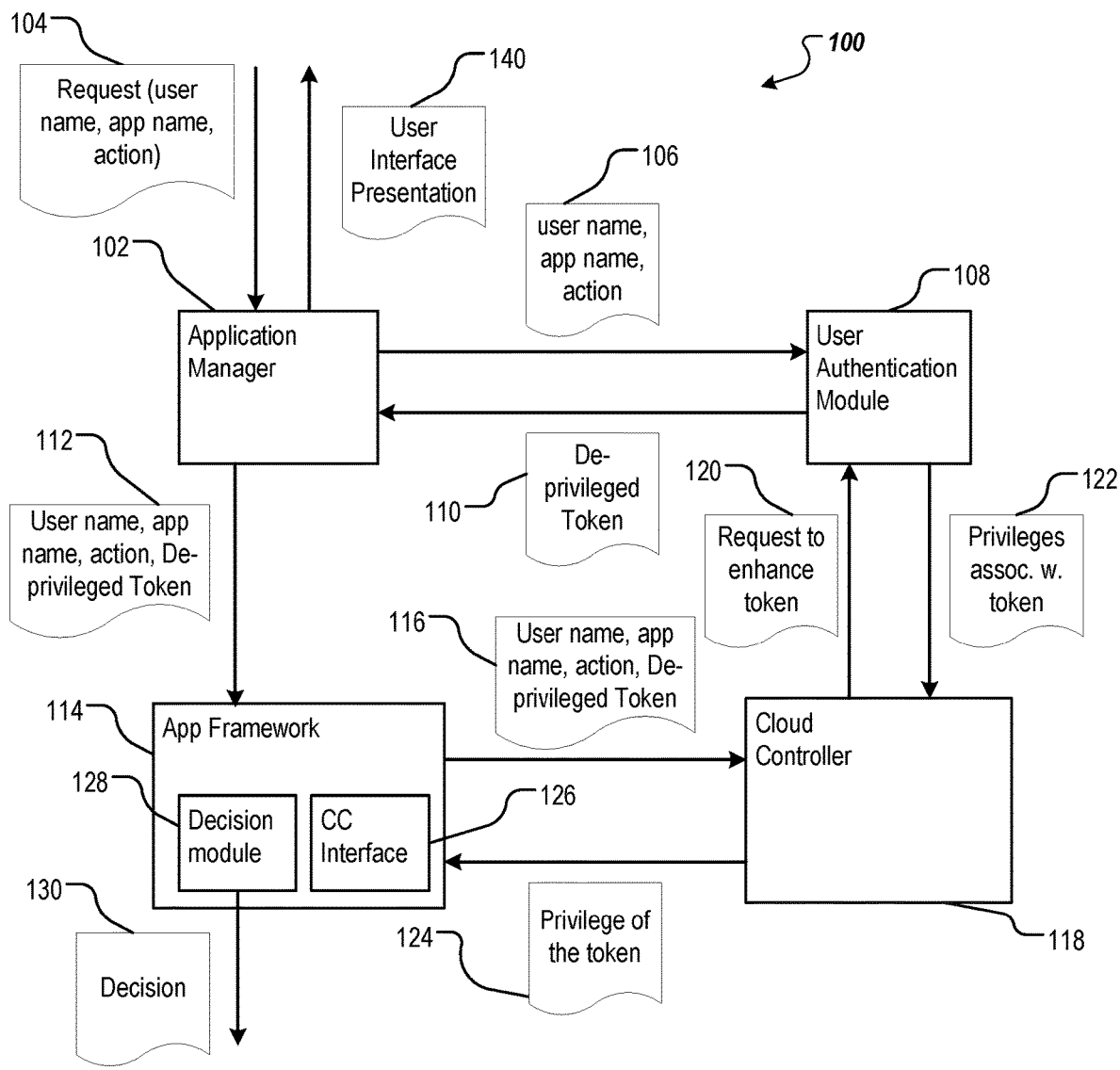
FIG. 1 is a block diagram illustrating example techniques of distributed validation of credentials.

FIG. 1 is a block diagram illustrating example techniques of distributed validation of credentials. A distributed computing system 100 implements distributed validation of credentials. The distributed computing system 100 provides a cloud-based computing environment and includes multiple components, which are described below. Each component of the distributed computing system 100 can be implemented on one or more computers each including one or more computer processors. An example of the distributed computing system 100 is a Pivotal Cloud Foundry (PCF) installation.

The distributed computing system 100 includes an application manager 102. The application manager 102 can include a Web based tool, a command line tool, or a batch processing tool for managing organizations, spaces, applications, services, and users. The application manager 102 can be, for example, a Pivotal Apps Manager component. The application manager 102 receives a first request 104. The first request 104 specifies a user, an application, and an action to be performed by the user on the application. For example, the first request 104 can include a user name, an application identifier, and a representation of the action. The action can be, for example, modifying the application, viewing environment variables of the application, among others.

In response to the first request 104, the application manager 102 submits a second request 106 to a user authentication module 108. The second request 106 is a request for partial authentication and includes at least one of the user name, application name or action as specified in the first request 104.

The user authentication module 108 is a component of the distributed computing system 100 configured to provide identity management service for the distributed computing system 100. The user authentication module 108 can perform a role as a token provider, e.g., as an OAuth2 provider as specified in the OAuth 2.0 Authorization Framework as published by Internet Engineering Task Force (IETF) Request for Comment (RFC) 6749. The user authentication module 108 can issue tokens for client applications to use when they act on behalf of system users. An example of the user authentication module 108 is a Pivotal UAA Server module.

Upon receiving the request 106, the user authentication module 108 issues a de-privileged token 110. The de-privileged token 110 is a token that indicates partial and incomplete rights of a user. For example, in the de-privileged token 110, some access rights to system operations may not be represented. The de-privileged token 110 can be a token conforming to the OAuth2.0 framework or other framework for authentication.

The application manager 102 receives the de-privileged token 110 as a response to the second request 106. In response to receiving the de-privileged token 110, the application manager 102 provides user authentication information 112 to an application framework 114. The user authentication information 112 can include one or more of the user name, the application identifier, the action, or the de-privileged token 110.

The application framework 114 is a framework for building Web applications. The application framework 114 is configured to, for example, handle dependency injection, handle transactions, and implement model-view-controller-architecture. An example of the application framework 114 is Pivotal Spring Boot. The application framework 114, upon receiving the user authentication information 112, can submit a third request 116 to a cloud controller 118. The third request 116 can include at least one of the user name, the application identifier, the action, and the de-privileged token 110 as provided in the user authentication information 112. The third request 116 causes the cloud controller 118 to perform secondary authentication separately from the first authentication operations between the application manager 102 and the user authentication module 108.

The cloud controller 118 is a component of the system 100 configured to direct deployment of applications on the system 100. The cloud controller 118 is also configured to provide REST API endpoints for client devices to access the system 100. The cloud controller 118 can maintain a database with records for organizations, spaces, services, and user roles, among others. In response to receiving the third request 116, the cloud controller 118 submits a fourth request 120 to enhance the token. The fourth request 120 to enhance the token can include at least one of the user name, application identifier, action, or de-privileged token 110. The fourth request 120 can include authentication information confirming the identity of the cloud controller 118. The cloud controller 118 can submit the fourth request 120 to enhance the token to the user authentication module 108. The cloud controller 118 preferably communicates with the user authentication module 108 over a secured and encrypted communication channel.

Through the secured and encrypted channel, the cloud controller 118 receives privileges 122 associated with the de-privileged token 110. The privileges 122 are the result of second authentication operations performed by the user authentication module 108. The privileges 122 can include information on whether the specific user has privilege to perform the specific action for a specific application, a specific deployment, or for a specific cloud controller operation. The privileges 122 can include privileges directed to system operations of the cloud controller 118.

Upon receiving the privileges 122, the cloud controller 118 presents a response 124 to the application framework 114 as a reply to the request 116. The cloud controller 118 can communicate with the application framework 114 over a secured and encrypted communication channel. The response can include the privileges 122 associated with the de-privileged token 110. The application framework 114 can include a cloud controller interface 126 for sending the request 116 and receiving the response 124. The cloud controller interface 126 ensures separation between the de-privileged token 110 and the privileges in the response 124.

The application framework 114 can include a decision module 128. The decision module 128 is a component of the application framework 114 that makes a decision based on the user name, application, and specification specified in the request 104 and the privileges 122 provided by the cloud controller 118 in the response 124. For example, the decision module 128 can perform a comparison between the user name, application, and specification and privileges. The decision module 128 can then provide a decision 130 to the application framework 114 or to another module. For example, in some implementations, the decision 130 can indicate to the application framework 114 whether to provide requested information for display in a Web interface of the application manager 102.

In some implementations, the application manager 102 can generate user interface presentations 140 that include the requested information. For example, as described below, the application manager can interact with the application framework 114 to determine whether a user has permission to access data for a particular actuator. If so, the application framework 114 can obtain data elements from the particular actuator and the application manager 102 can generate and provide, e.g., to a user device of the user, a user interface presentation 140 that includes the data elements. Example user interface presentations that can be generated by the application manager 102 are shown in FIGS. 4-12 and described below.

Figure 2:
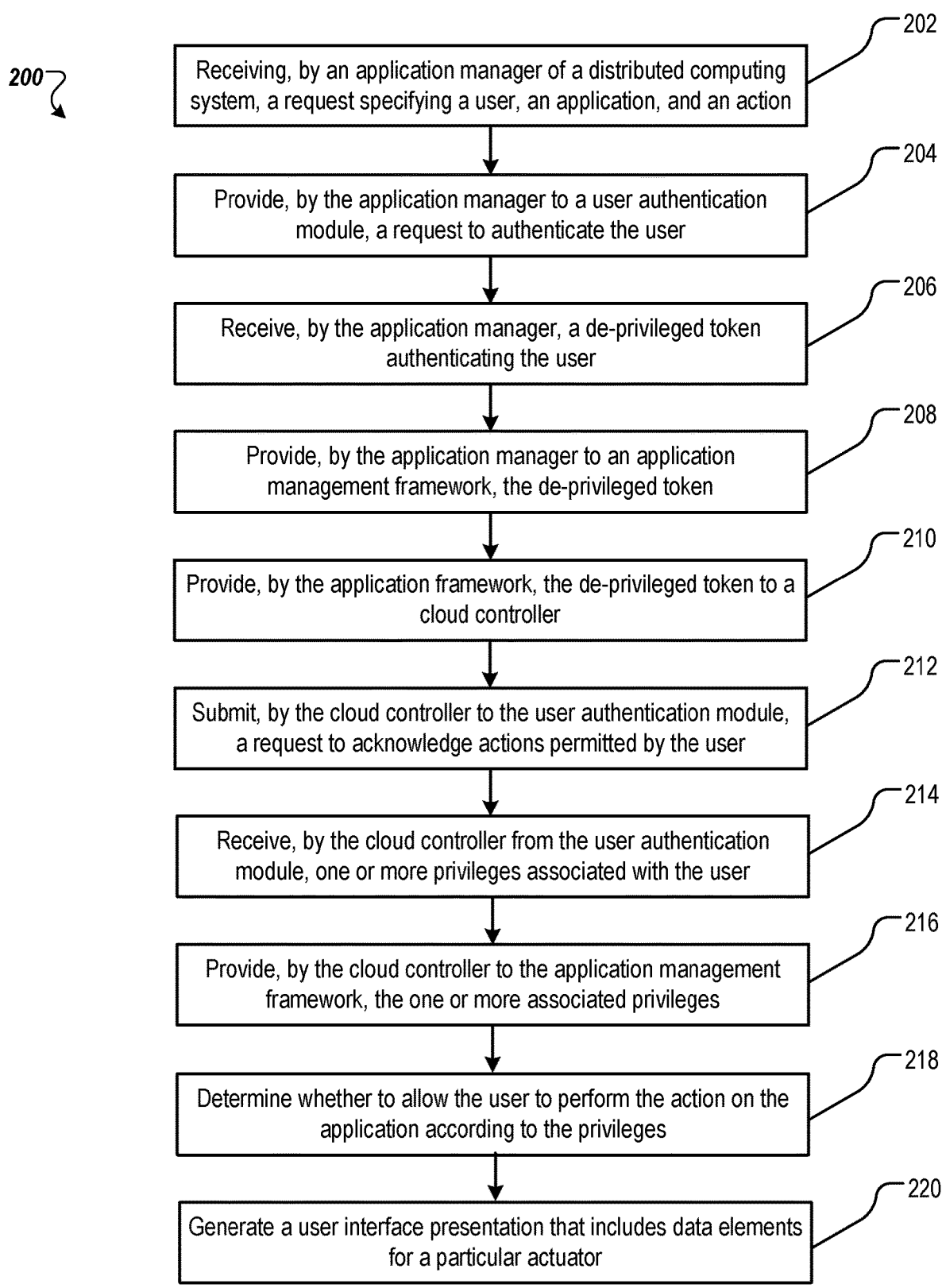
FIG. 2 is a flowchart illustrating an example process of distributed validation of credentials.

FIG. 2 is a flowchart illustrating an example process 200 of distributed validation of credentials. Process 200 can be executed by a distributed computing system, e.g., the distributed computing system 100 discussed in reference to FIG. 1. Each component of the system as described below can be implemented on one or more computers including one or more hardware processors.

An application manager of the system receives (202) a request from or on behalf of a user, an application, and an action to be performed by the user on or in reference to the application. The application manager can receive the request from a command line input, a batch script, a Web browser based user interface, or any other suitable interface. The action can include, for example, at least one of viewing health, viewing application-specific information, viewing environment variables, viewing contents of memory, viewing thread diagnostics, viewing application-specific metrics, and viewing or modifying configurations of application. The application can be an application that exposes an API, e.g., REST API, while executing in the distributed computing system. The application may expose an API that is different from a core API, e.g., an API for a cloud controller, a user authentication module, or a routing module. Accordingly, authorities represented by tokens for the application may be different from, and may be prevented from commingling with, authorities for accessing the core API.

The application manager of the system provides (204), to a user authentication module of the system, a request to authenticate the user. The user authentication module can include a UAA server of the system. The user authentication module can be a component compliant to the OAuth2.0 framework or other authentication frameworks.

The application manager of the system receives (206), from the user authentication module, de-privileged token authenticating the user. The de-privileged token includes partial access rights associated with the user. A de-privileged token is an authorization token that authorizes less than all the rights permissible for a user. The de-privileged token does not include authorization for accessing certain system functions, e.g., for manipulating a cloud controller.

The application manager of the system provides (208), to an application framework of the system, data identifying the specified user, application, and action and the de-privileged token. The application framework can be a bootstrap application framework, e.g., a Pivotal Spring Boot framework.

The application framework provides (210) the de-privileged token to a cloud controller of the system. Compared to conventional techniques where complete authentication is associated with the token, providing only the de-privileged token to the cloud controller provides additional security by allowing the crowd controller to perform a separate authentication operation without user interference.

The cloud controller of the system submits (212), to the user authentication module, a request to enhance the de-privileged token. The request can seek acknowledgement on what actions are permitted by the user. The request includes the de-privileged token.

The cloud controller of the system receives (214), from the user authentication module, information one or more privileges associated with the user that are not represented in the de-privileged token. The one or more privileges can be system access privileges, e.g., privileges for accessing functions of the cloud controller for manipulating deployment of the application. The privileges are privileged of a user that are not represented in the de-privileged token.

The cloud controller of the system provides (216) the one or more associated privileges to the application framework, for example, through an encrypted channel, and without providing the de-privileged token. On each of the application manager, the application framework and the cloud controller, the privileges and the de-privileged token are encoded and stored separately.

The application framework of the system determines (218) whether to allow the user to perform the action on the application based on a comparison between the action and the one or more privileges. Upon determining that the user has the permissions needed to perform the action, a component of the system performs the action and presents a result of the action to the user, e.g., on an output device. For example, the system can present the result of the action for display in a Web browser on a display screen of a client device. Accordingly, from the user's point of view, the distributed authentication of credentials described in this specification can be invisible.

In some implementations, the application manager of the system generates a user interface presentation that includes data elements for a particular actuator for which the user has permission to access (220). For example, the action can be to request data from the particular actuator. In another example, the action can be to change the configuration of a particular actuator, e.g., based on user interactions with a user interface generated by the application manager. Example user interface presentations that can be generated by the application manager are shown in FIGS. 4-12 and described below.

Figure 3:
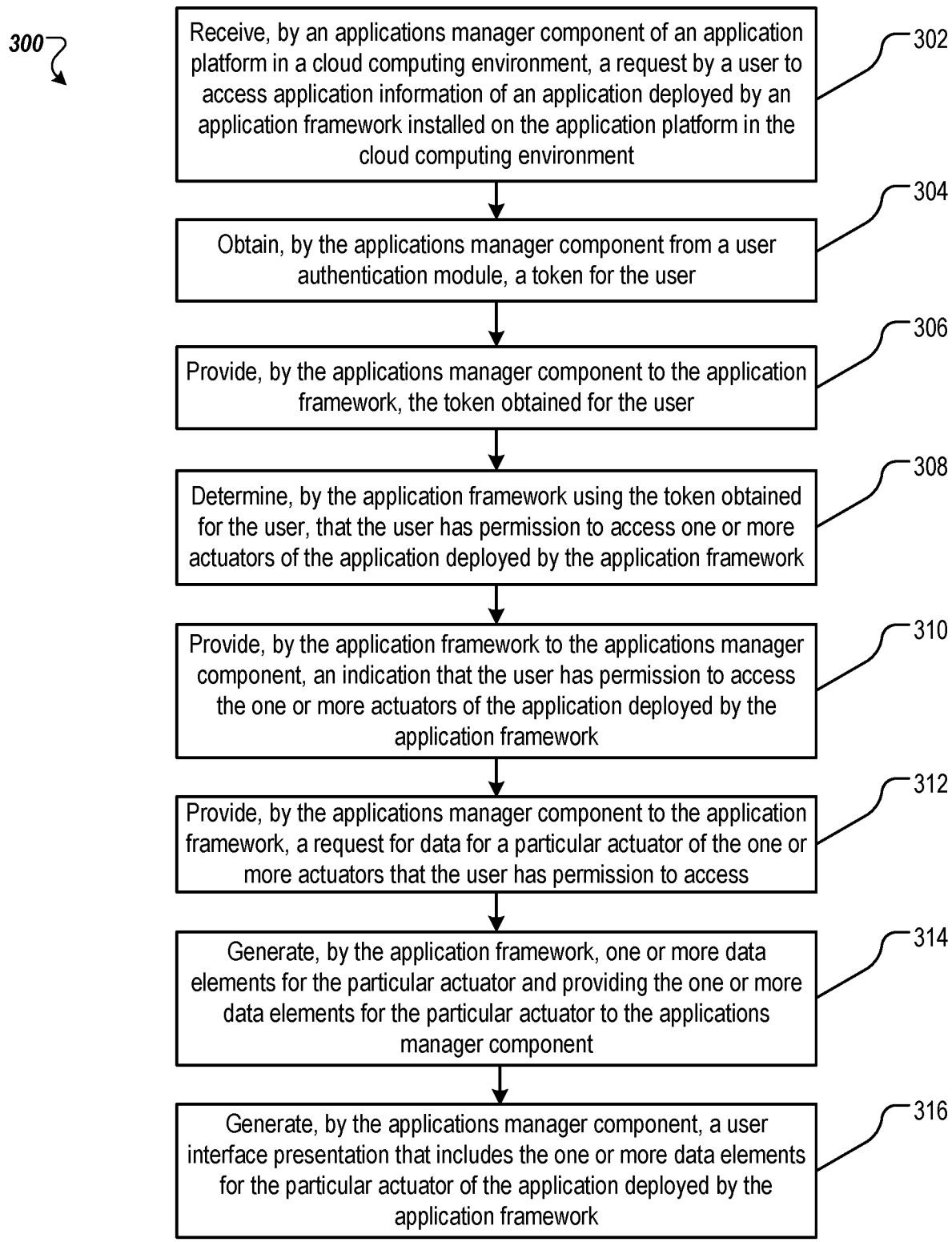
FIG. 3 is a flowchart illustrating an example process of generating a user interface presentation of data elements for an actuator of an application deployed by an application framework.

FIG. 3 is a flowchart illustrating an example process 300 of generating a user interface presentation of data elements for an actuator of an application deployed by an application framework. For convenience, the process 300 will be described as being performed by a system of one or more computers, located in one or more locations, and programmed appropriately in accordance with this specification. For example, the process 300 can be performed by a distributed computing system, e.g., the distributed computing system 100 of FIG. 1.

An applications manager component of an application platform in a cloud computing environment receives a request by a user to access application information of an application (302). The application can be deployed on by an application framework installed on the application platform. The applications manager component, e.g., the application manager 102 of FIG. 1, can receive the request from a command line input, a batch script, a Web browser based user interface, or any other suitable interface.

The request can be to view information related to the health of the application, mappings to endpoints, log levels of the application, general information about the application, requests received by the application, e.g., HTTP requests, and/or threads running in the application. The request can be to view information generated and output by one or more actuators. As described above, an actuator is an application-framework-supplied capability that is automatically added to an application and that provides an interface for monitoring and interacting with the application.

Prior to receiving the request, the system can receive the application to be deployed by the application framework installed on an application platform of the cloud computing environment. The application can have an associated configuration that specifies enabling one or more framework actuators for the application. The application framework can deploy the application and enable the actuators in response to receiving the request, e.g., without further input from the user that submitted the request.

The applications manager component obtains a token for the user from a user authentication module (304). For example, as described above, the applications manager component can send, to the user authentication module, a request to authenticate the user and receive, from the user authentication module, a de-privileged token authenticating the user. The de-privileged token includes partial access rights associated with the user.

The applications manager component provides, to the application framework, the token obtained for the user (306). The application framework determines, using the token obtained for the user, that the user has permission to access one or more actuators of the application deployed by the application framework (308). For example, the partial access rights of the token can include permission to access the one or more actuators.

The one or more actuators can include a view information actuator, a health check actuator, a mappings actuator, a log level actuator, a heap dump actuator, a trace actuator, a thread dump actuator, and/or another appropriate type of actuator. Each actuator can obtain and/or generate data related to an application and provide one or more data elements that include the data.

The view information actuator can obtain general information about the application. For example, the view information actuator can access metadata for the application, e.g., from a metadata field of the application that was populated when the application was built, and provide one or more data elements that specify the metadata. The information actuator can also obtain, for applications for which its version is controlled using Git, git information for the latest git commit and provide the git information in the one or more data elements.

The health check actuator can obtain health data for the application and provides one or more data elements that specify the health data. The health data obtained by the health check actuator can be defined by a user. That is, a user can configure the health check actuator to obtain and provide health data for the application that is of interest to the user. The health data can include, for example, the status of the application, the status of underlying resources used by the application, e.g., data storage, databases, processors, etc., metrics related to the underlying resources, e.g., amount of available disk space, and/or other appropriate application health data.

The mappings actuator can obtain a list of endpoints for which the application is listening. The mappings actuator can also obtain, for each endpoint, a method that responds to requests for the endpoint. This information can be used to diagnose issues with an endpoint. For example, when there is an issue with an endpoint, the user can evaluate the method that is configured to respond to the requests.

The log level actuator enables a user to configure the log levels for one or more loggers that log information for the application. The log level for a logger defines the type of information collected and logged by the logger. The log levels can include, for example, an off level, a fatal level, an error level, a warn level, an information level, a debug level, and a trace level.

When the log level of a logger is modified, e.g., by a user, the log level actuator can change the log level of the logger in each instance of the application in real time without having to redeploy the application. This enables users to quickly and easily change the log level in real time to view different information based on events, e.g., if the application or a part of it is experiencing problems.

The heap dump actuator can trigger a heap dump of the application and output a file that includes the heap dump. A heap dump is a snapshot of the memory for an application at a given point in time. The heap dump actuator can generate and output a .zip file that includes the heap dump. The heap dump actuator can trigger a heap dump for a particular instance of the application, e.g., an instance specified by a user as described below.

The trace actuator can obtain tracing information and provides one or more data elements that specify the tracing information. The tracing information can be information related to trace requests, e.g., HTTP requests, received by the application. The tracing information can include tracing information for each instance of the application.

The thread dump actuator can trigger a thread dump of the application and provide one or more data elements that specify the current threads running in the application and their respective statuses. The thread dump actuator can trigger a thread dump for a particular instance of the application, e.g., an instance specified by a user as described below.

In response to determining that the user has permission to access one or more actuators of the application deployed by the application framework, the application framework provides, to the applications manager component, an indication that the user has permission to access the one or more actuators of the application deployed by the application framework (310).

The applications manager component provides, to the application framework, a request for data for a particular actuator of the one or more actuators that the user has permission to access (312). For example, a user may have access to less than all of the actuators deployed in the application. The applications manager component can provide a request for data for the actuator(s) to which the user has permission to access.

In another example, the user can request the data for a particular actuator. For example, the user can request the data for a particular actuator using a user interface control of a user interface, as described below.

The application framework generates one or more data elements for the particular actuator and provides the one or more data elements for the particular actuator to the applications manager (314). The application framework can obtain the data for the particular actuator from the particular actuator and generate the one more data elements that include the data for the particular actuator. For example, if the particular actuator is the health check actuator, the application framework can obtain data related to the health of the application from the health check actuator and generate the one or more data elements that include the obtained data.

The applications manager component generates a user interface presentation that includes the one or more data elements for the particular actuator of the application deployed by the application framework (316). Each actuator can have a different user interface presentation as the actuators provide different types of data. The applications manager component can generate the user interface presentation based on the actuator and using the one or more data elements. For example, the applications manager component can generate the appropriate user interface and populate the user interface with the data elements to generate the user interface presentation. Example user interfaces that can be generated by the applications manager component are illustrated in FIGS. 4-12 and described below.

Figure 4:
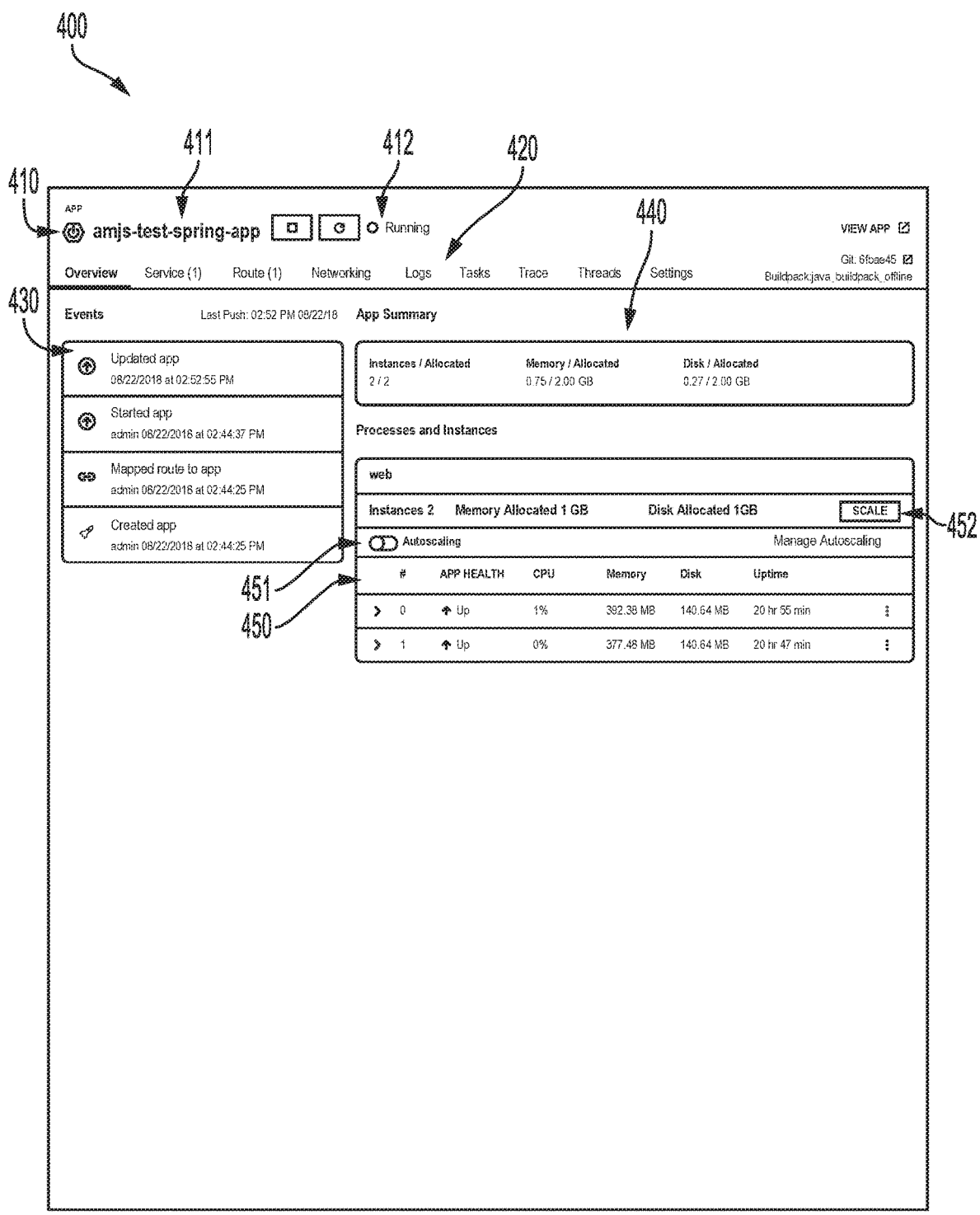
FIG. 4 depicts an example application summary user interface that presents a summary of information for an application.

FIG. 4 depicts an example application summary user interface 400 that presents a summary of information for an application. The application summary user interface 400 can be presented in response to user selection, or user input, of an application of interest to the user. The application summary user interface 400 can be generated by the applications manager of an application platform in a cloud computing environment.

The application summary user interface 400 includes the application's name 411 and the application's status 412. In this example, the status 412 indicates that the application is currently running. The application summary user interface 400 also includes a Pivotal Spring Boot icon 410 indicating that the application is a Spring Boot application for which enhanced functionality is available. The enhanced functionality can include actuators that provide data about the application.

In some implementations, the application includes an actuator that indicates that the application is a Spring Boot application and that the actuator(s) are enabled. In this example, the applications manager can present the icon in the application summary user interface 400 and other user interfaces described below based on data received from the actuator of the application indicating that the application is a Spring Boot application and that the actuator(s) are enabled. This indicates to the user that the applications manager has access to additional data related to the application that would not be available absent the actuator(s).

In some implementations, the applications manager only presents the icon 410 if the user that requested the application summary user interface 400 has permission to access at least one of the actuator(s) of the application.

Figure 11:
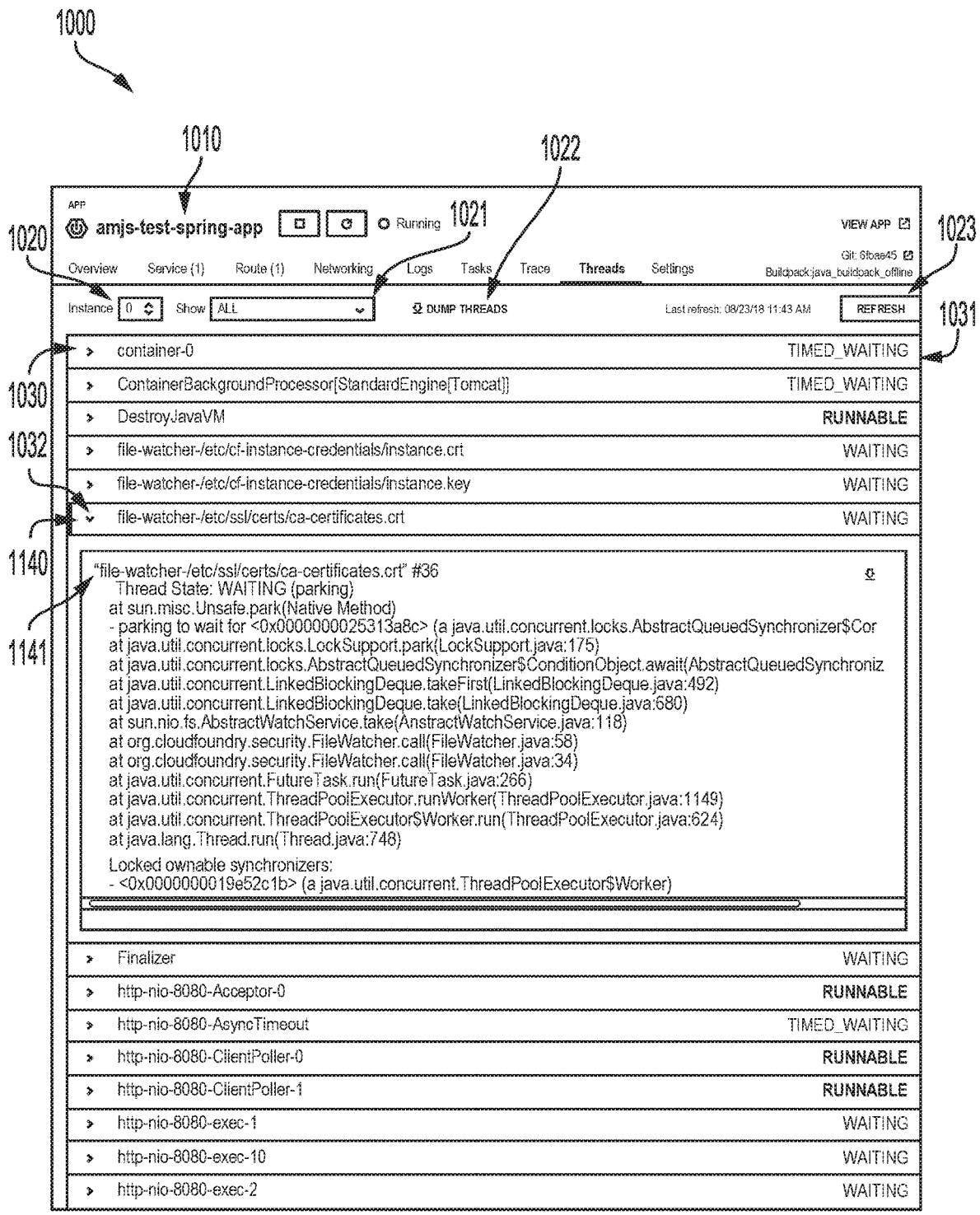
FIG. 11 depicts the example thread dump user interface of FIG. 10 with expanded information for a thread.

The application summary user interface 400 includes tabs 420 for navigating to various user interfaces that present data related to the application. Some of the tabs 420 can trigger a request for data from an actuator. For example, user selection of the "Trace" tab can trigger a request for the trace actuator to provide information related to trace requests, e.g., HTTP requests, received by the application. The applications manager can receive one or more data elements that include the information, e.g., using the process 300 of FIG. 3 and generate a user interface presentation that includes the information. An example trace information user interface 1100 is illustrated in FIG. 11 and described below.

The application summary user interface 400 includes an event interface element 430 that includes a list of events, e.g., a list of the most events for the application. The application summary user interface 400 also includes an application summary element 440 that includes general information about the application. In this example, the application summary element 440 includes the number of instances of the application that are running, the amount of memory allocated to the application instances, and the amount of disk space allocated to the application instances.

The application summary user interface 400 also includes a process and instances interface element 450 that includes information about the instances of the application that are currently running. In this example, the process and instances interface element 450 includes the number of instances running, the amount of memory allocated to the instances, and the amount of disk space allocated to the instances.

The process and instances interface element 450 also includes, for each instance of the application currently running, the health of the application instance, the CPU usage of the application instance, the amount of memory allocated to the application instance, the amount of disk space allocated to the application instance, and uptime duration for the application instance. The process and instances interface element 450 also includes an autoscaling interface control 451 that enables a user to turn autoscaling for the application on and off. The process and instances interface element 450 also includes a scale interface control 452 that enables a user to scale the application, e.g., add or delete one or more instances of the application. The applications manager can present a user interface that enables the user to add or delete instances in response to user selection of the scale interface control 452.

Figure 5:
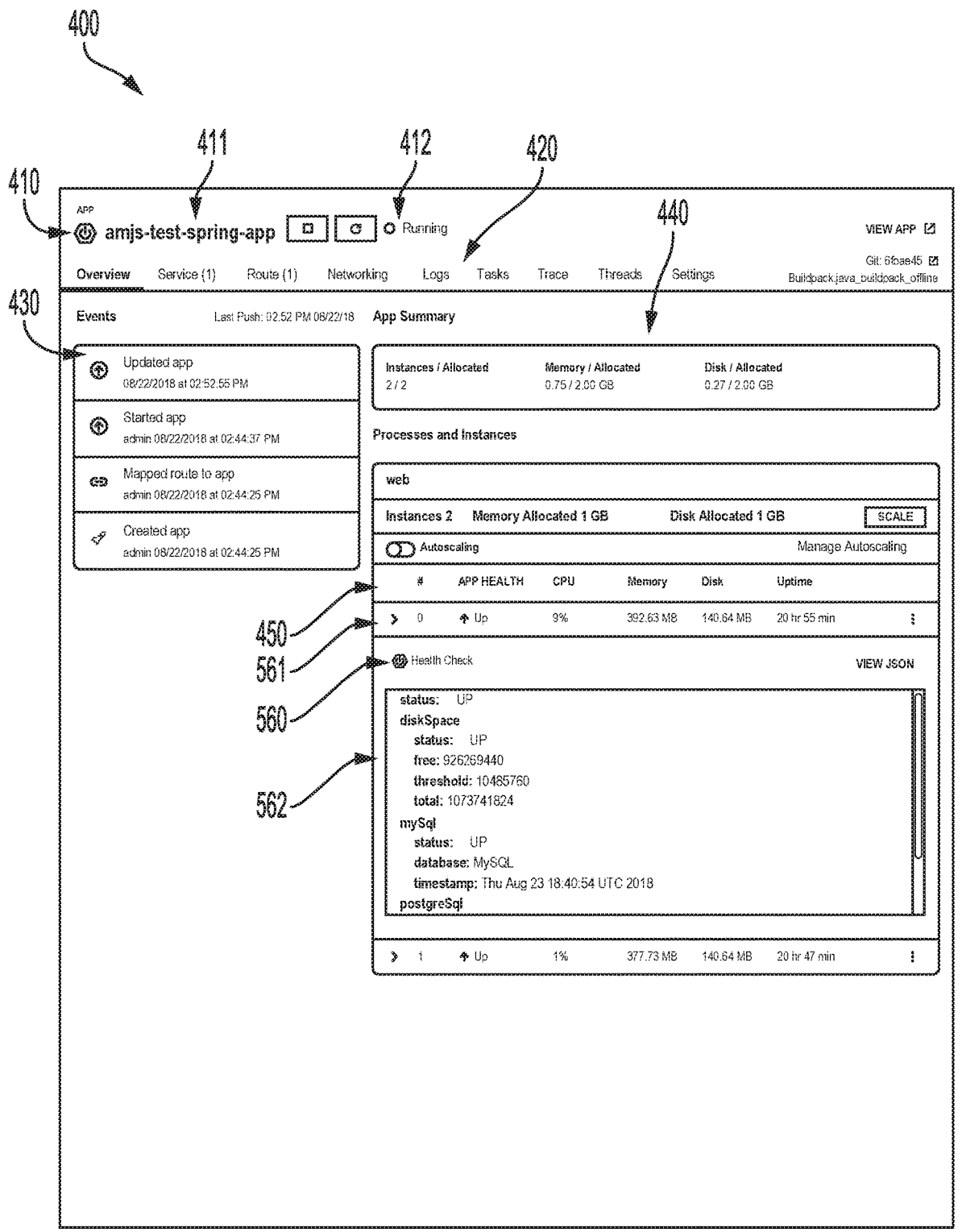
FIG. 5 depicts the example application summary user interface of FIG. 4 with a health check interface that presents data related to the health of an application instance.

FIG. 5 depicts the application summary user interface 400 of FIG. 4 with a health check interface 560 that presents data related to the health of an application instance. For example, the applications manager can present the health check interface 560 for an application instance in response to user selection of an expansion control element 561 for the application instance.

The health check interface 560 includes health data 562 for the application instance. The applications manager can obtain the health data from the health check actuator for the application instance. For example, the applications manager can request the health data from the health check actuator using the process 300 of FIG. 3 in response to the user selection of the expansion control element 561.

As described above, the health data provided by a health check actuator can be defined by a user. In this example, the health data includes the status of the application instance, e.g., "UP," data related to the disk space used by the application instance and data related to the database used by the application instance.

Figure 6:
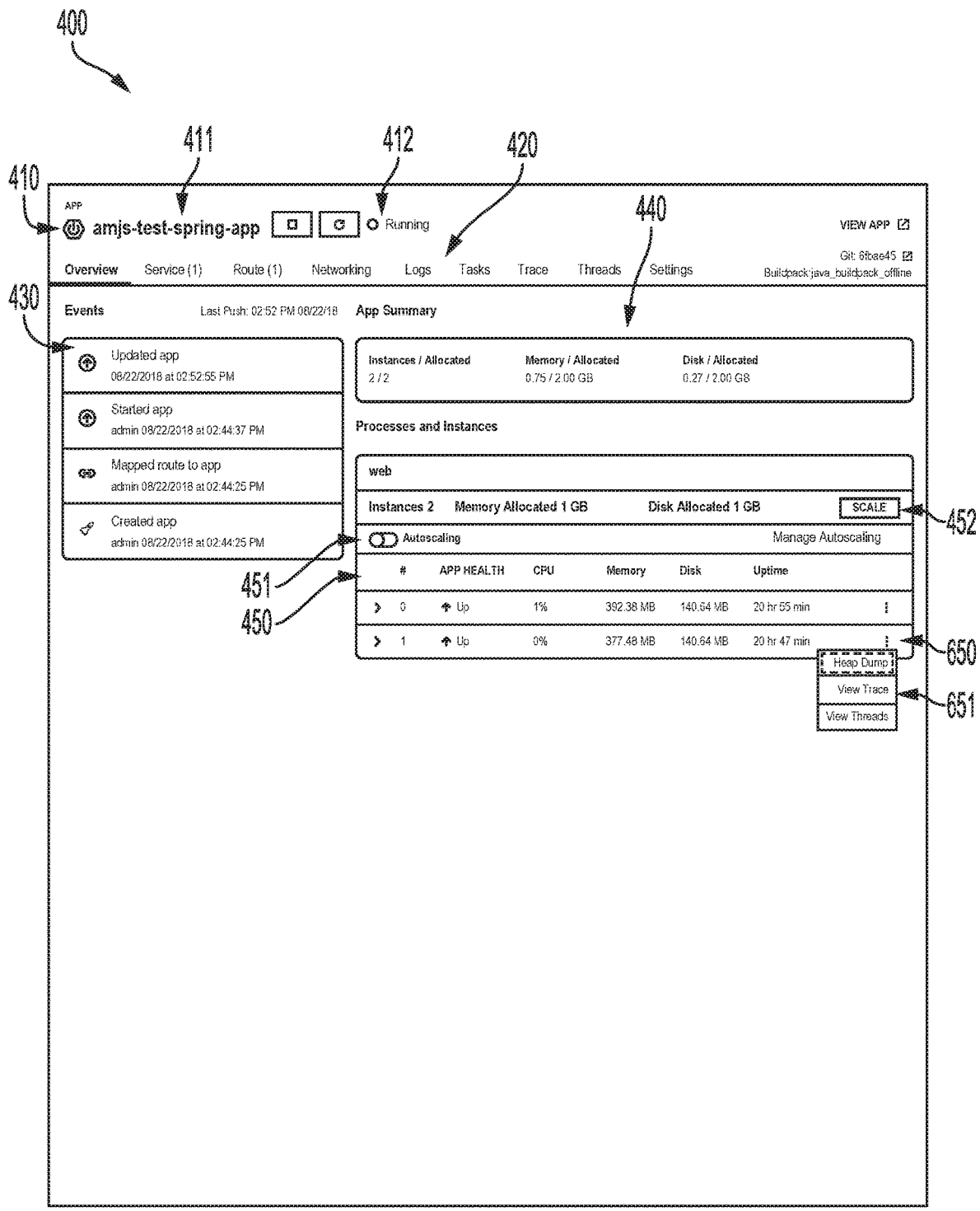
FIG. 6 depicts the example application summary user interface of FIG. 4 with a menu for requesting additional information for an application instance.

FIG. 6 depicts the example application summary user interface 400 of FIG. 4 with a menu for requesting additional information for an application instance. The applications manager can present the menu 651 in response to user selection of a menu button 650. The menu 651 can be presented for any application instance for which the user selects the menu button 650. The menu 651 allows the user to request a heap dump, to view trace information, e.g., the trace information user interface 1200 of FIG. 12, or to view current threads of the application instance, e.g., in the thread dump interface 1000 of FIG. 10.

If the user selects the heat dump from the menu 651, the applications manager can request a heap dump for the application instance from a heat dump actuator of the application instance. As described above, the heat dump actuator can trigger a heap dump and generate a file that includes the heap dump data. The applications manager can download the file to the user's device, e.g., and store the file in a default or user-specified location.

Figure 7:
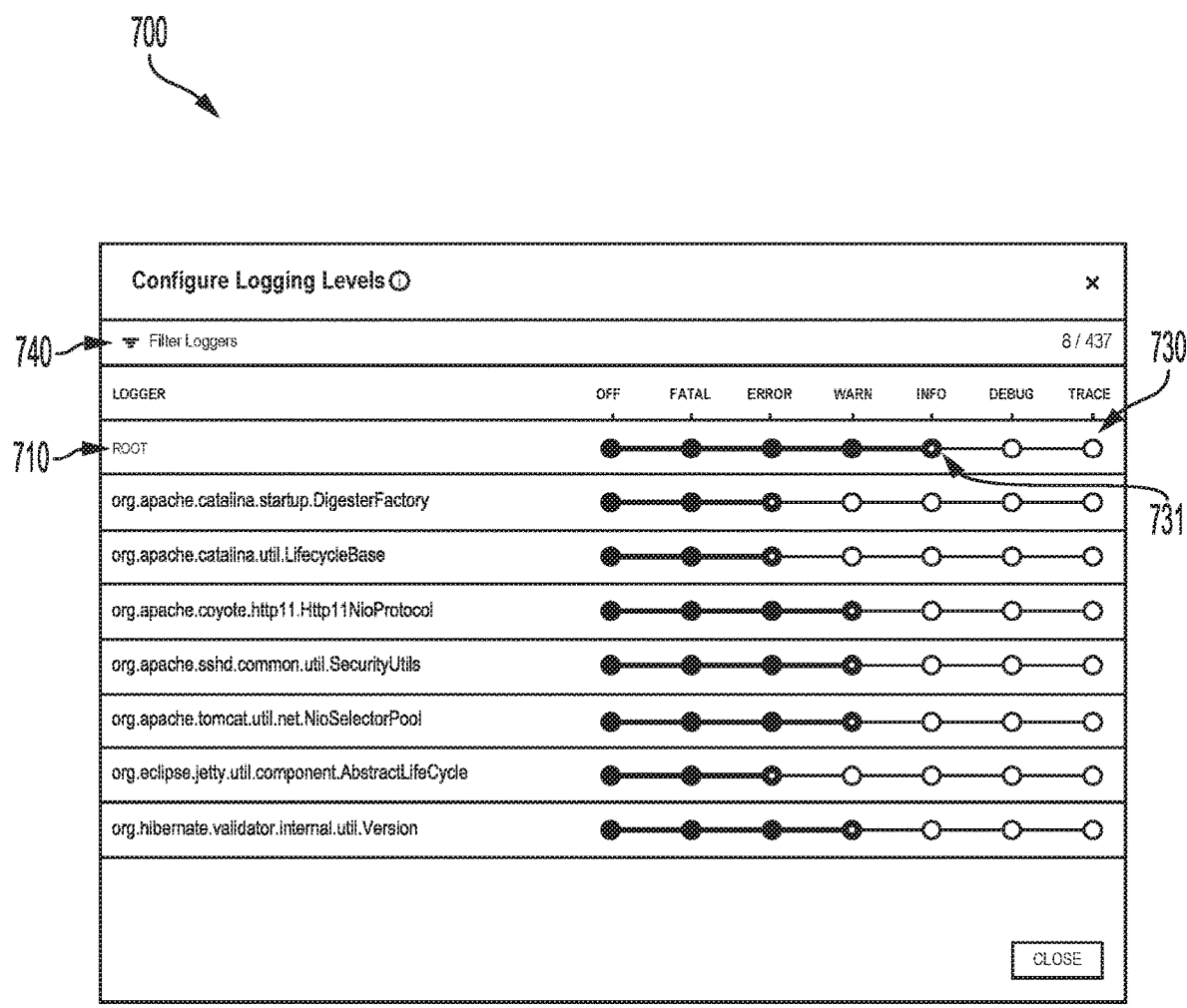
FIG. 7 depicts an example log level configuration user interface that enables a use to configure log levels for an application.

FIG. 7 depicts an example log level configuration user interface 700 that enables a user to configure log levels for an application. The log level configuration user interface 700 includes a list of loggers 710. Each logger can be associated with a respective application or component of the application.

The log level configuration user interface 700 includes, for each logger a log level list 730 associated with the logger. The log level list 730 for a logger includes a set of log level of the application or component of the application. In this example, the log level list 730 for each logger includes an off level, a fatal level, an error level, a warn, level, an information level, a debug level, and a trace level. In some implementations, the log level list for a particular logger can include different log levels than another logger.

In some implementations, the log levels in the log level list 730 are ordered. For example, the off level can be the lowest in the list and the trace level can be the highest level. When a particular log level is selected for a logger, the logger logs events at the selected log level and each log level below the selected log level in the list. For example, if the warn level is selected, the logger will log events for the warn level, the error level, and the fatal level.

A user can use the log level configuration user interface 700 to configure the log level for each logger in the list 710. For example, the user can select the log level from the log level list 730 for the logger. In response, the applications manager can change the log level for the logger in each instance of the application for which the log level has been changed, e.g., by submitting a request to the log level actuator via the application framework. The applications manager can make the change without redeploying the application. For example, if a user changes the log level for a particular logger for a particular application, the applications manager can change the log level for the particular logger in each instance of the particular application that is currently deployed without redeploying the application. In this way, there is no disruption of the application instances to change the log level.

The highest level of each log level list can include a reset button 731. Selection of the reset button causes the applications manager to reset the log level of the logger corresponding to the selected reset button to its default log level.

The log level configuration user interface 700 includes a filtering control 740. The filtering control 740 enables the user to filter the list of loggers 710. In some implementations, the applications manager presents a textual filter editing field in response to user selection of the filtering control 740. The user can enter text into the textual filtering field. The applications manager can filter the list 710 based on the text, e.g., to include only loggers that include the text in their name.

In some implementations, the applications manager orders the loggers in the list of loggers based on whether the logger is user-configured. For example, if a user configures the log level of a logger, the applications manager can move, e.g., float, the logger up in the list 710, e.g., to the top of the list 710. In this way, users can easily view and further configure the loggers that have been configured.

Figure 8:
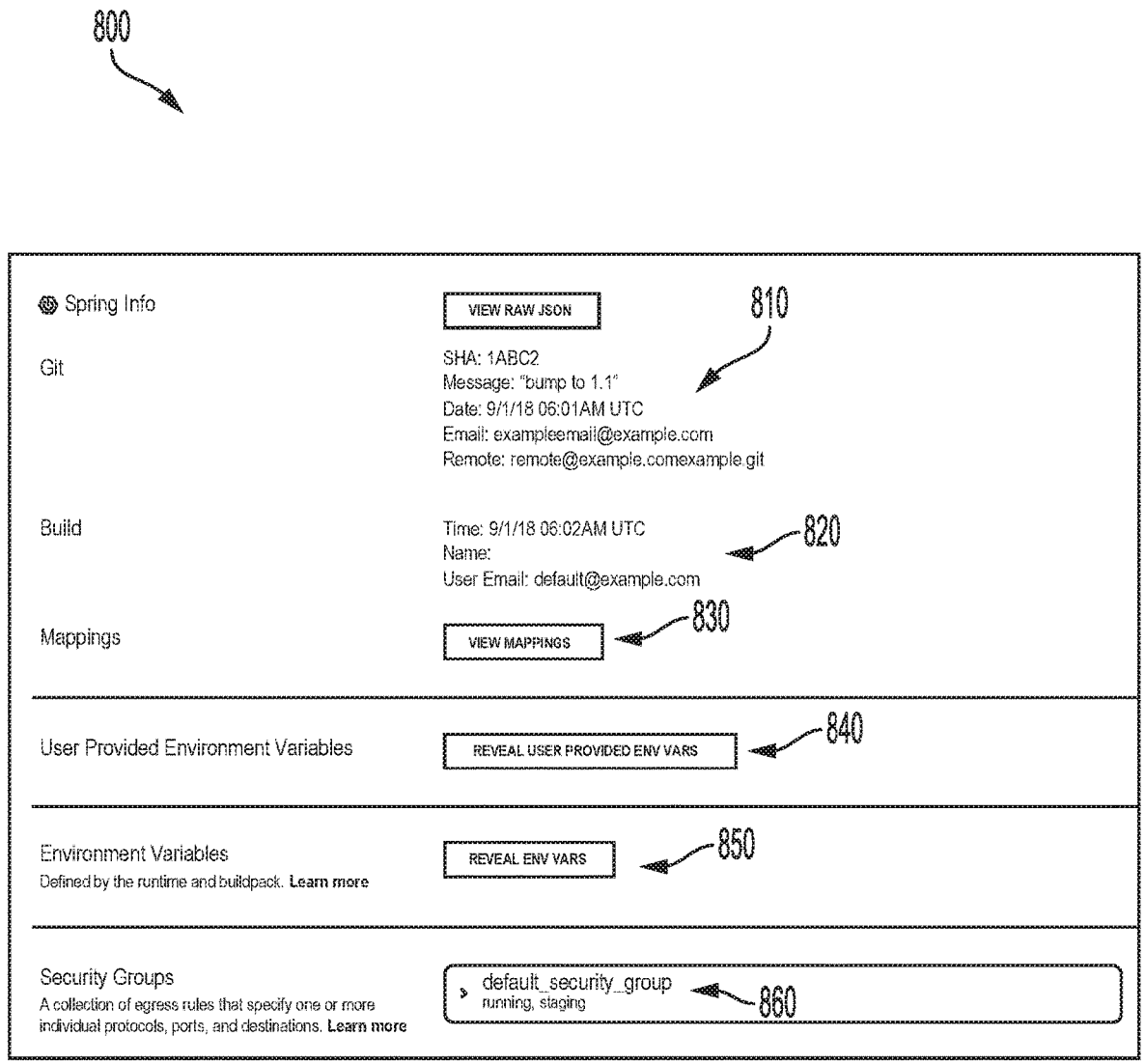
FIG. 8 depicts an example application information user interface that presents information about an application.

FIG. 8 depicts an example application information user interface 800 that presents information about an application. The application information user interface 800 can present data received from a view information actuator of the application. The application information user interface 800 includes a Git information element 810 that includes Git information for the latest Git commit for the application. In this example, the Git information element 810 includes the SHA hash for the Git information, a message included in the Git commit, the data of the Git commit, and an e-mail address and remote for the Git commit.

The application information user interface 800 also includes a build information element 820 that includes information for a current build of the application. The view information actuator can obtain the build information for the application from metadata of the application generated when the application was built. In this example the build information element 820 includes the time of the build, the name of the build, and the e-mail address associated with the build.

The application information user interface 800 also includes a user provided environmental variables control element 840. The applications manager can present any user provided environment variables in response to user selection of the user provided environmental variables control element 840. Similarly, the application information user interface 800 also includes an environmental variables control element 850. The applications manager can present environment variables defined by the runtime and buildpack in response to user selection of the environmental variables control element 850. The application information user interface 800 also includes a security groups element 860 that includes security groups associated with the application.

Figure 9:
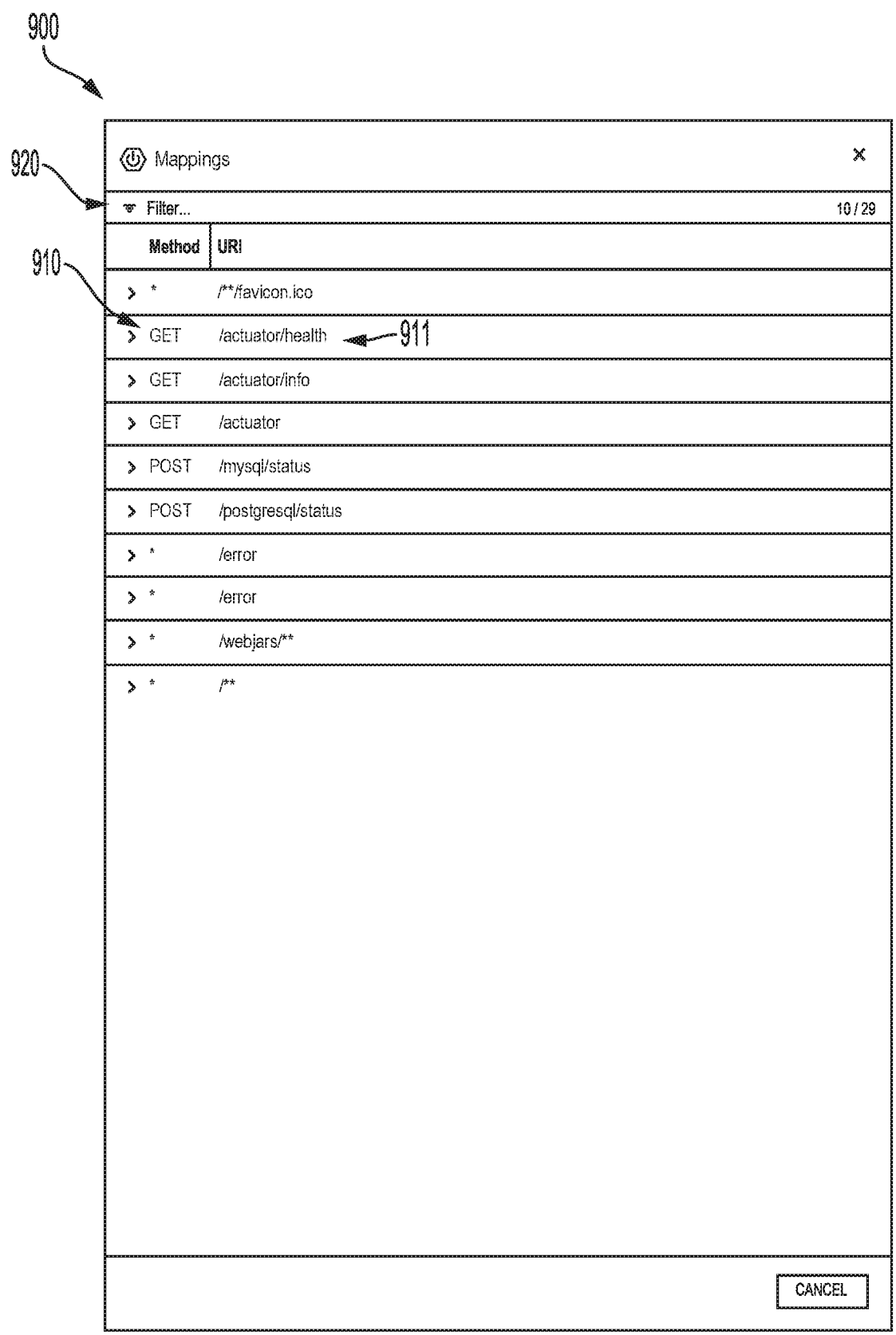
FIG. 9 depicts an example mappings user interface that presents endpoints to which an application is mapped.

FIG. 9 depicts an example mappings user interface 900 that presents endpoints 910 to which an application is mapped. Each endpoint 910 is configured to respond to requests for the application. The example mappings user interface 900 also presents, for each endpoint 910, a corresponding method 911 that is configured to respond to the requests. The applications manager can obtain the list of endpoints and the method of each endpoint from a mappings actuator of the application.

This mappings user interface 900 can be used to diagnose issues with an endpoint. For example, when there is an issue with an endpoint, the user can access the mappings user interface 900 to identify the method that is configured to respond to requests and then evaluate the method to determine the cause of the issue.

The mappings user interface 900 also includes a filtering control 920. The filtering control 920 enables the user to filter the list of endpoints 910. In some implementations, the applications manager presents a textual filter editing field in response to user selection of the filtering control 920. The user can enter text into the textual filtering field. The applications manager can filter the list of endpoints 910 based on the text, e.g., to include only endpoints 910 that include the text in their name.

Figure 10:
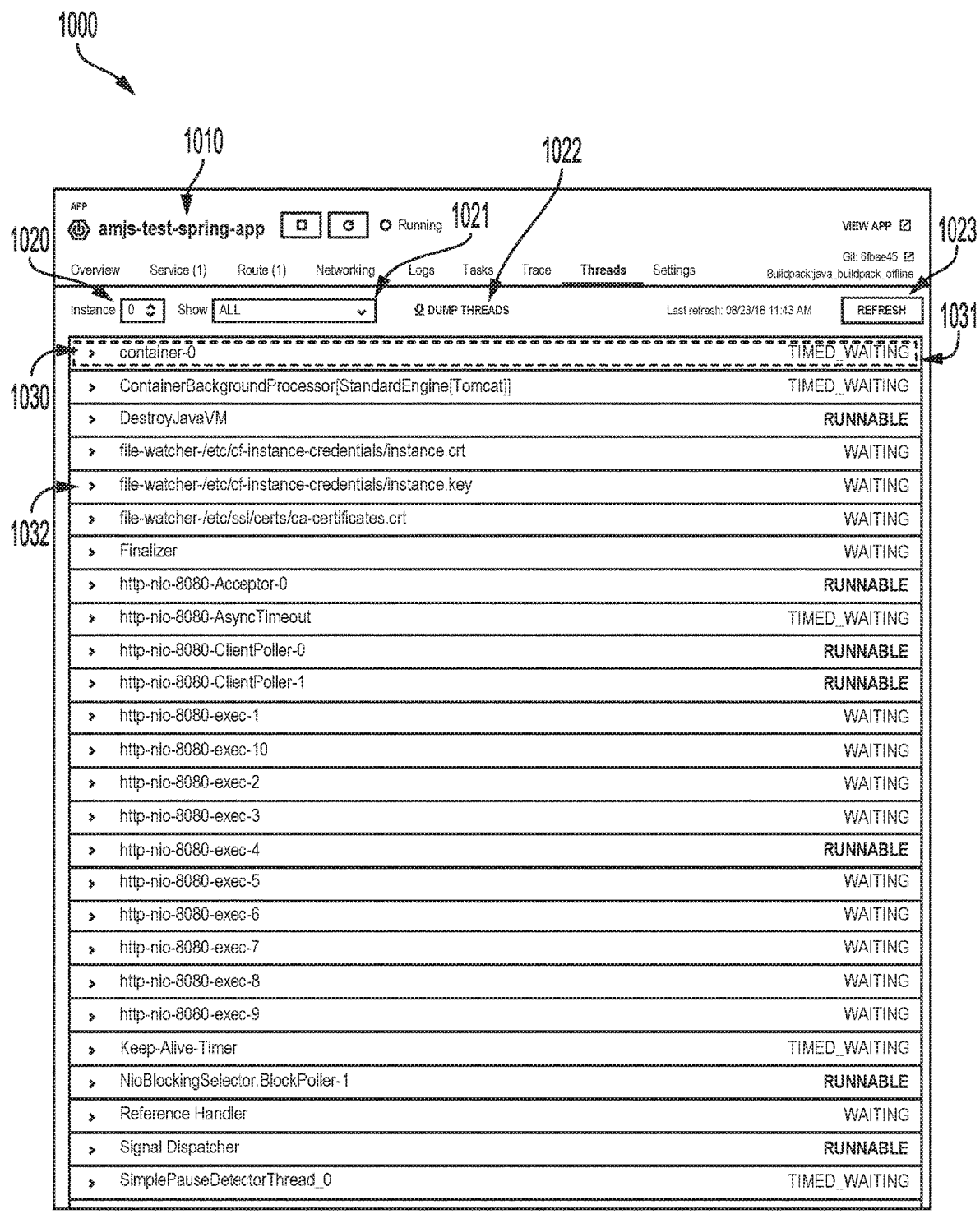
FIG. 10 depicts an example thread dump user interface that presents current threads running on an application and their statuses.

FIG. 10 depicts an example thread dump user interface 1000 that presents current threads running on an application and their statuses. The thread dump user interface 1000 presents data related to current threads running in an application. The applications manager can obtain the list of threads and their statuses from a thread dump actuator of the application.

The thread dump user interface 1000 includes the name of the application 1010 and a list of threads 1030 currently running in the application. The thread dump user interface 1000 also includes, for each thread 1030, the status 1031 of the thread. The thread dump user interface 1000 also includes, for each thread 1030, an expansion control element 1032 that enables a user to view additional information about the thread 1030, as shown in FIG. 11 and described below.

The thread dump user interface 1000 can present the threads 1030 running in all instances of the application. The thread dump user interface 1000 also includes an instances selection control 1020 that enables the user to view threads running in particular instances of the application. For example, the user can select the particular instance by entering the instance number in the instances selection control 1020 or incrementing or decrementing the instance number using the up and down arrows of the instances selection control 1020. In response, the applications manager can update the list of threads 1030 to present the current threads running on the selected instance.

The thread dump user interface 1000 also includes a show drop down menu 1021 that enables the user to filter the threads shown in the thread dump user interface 1000. The thread dump user interface 1000 also includes a dump thread control 1022 that, when selected, causes the applications manager to requests a thread dump for the application from the thread dump actuator of the application. The thread dump user interface 1000 also includes a refresh control 1023 that, when selected, causes the applications manager to refresh the data presented in the thread dump user interface 1000. If the refresh control 1023 is selected, the information for each thread can be refreshed at the thread dump user interface 1000.

FIG. 11 depicts the example thread dump user interface 1000 of FIG. 10 with expanded information 1141 for a thread 1140. The expanded information 1141 can be presented in response to user selection of the expansion control element 1032 for the thread 1141. The expanded information 1141 includes, for the thread 1140, methods and processes that have been recently performed in the thread 1140. As shown in FIG. 11, the other threads in the list can be moved down in the interface 1000 to make room for the expanded information 1141. In some implementations, the expanded information 114 can be presented above the other threads or in another interface.

Figure 12:
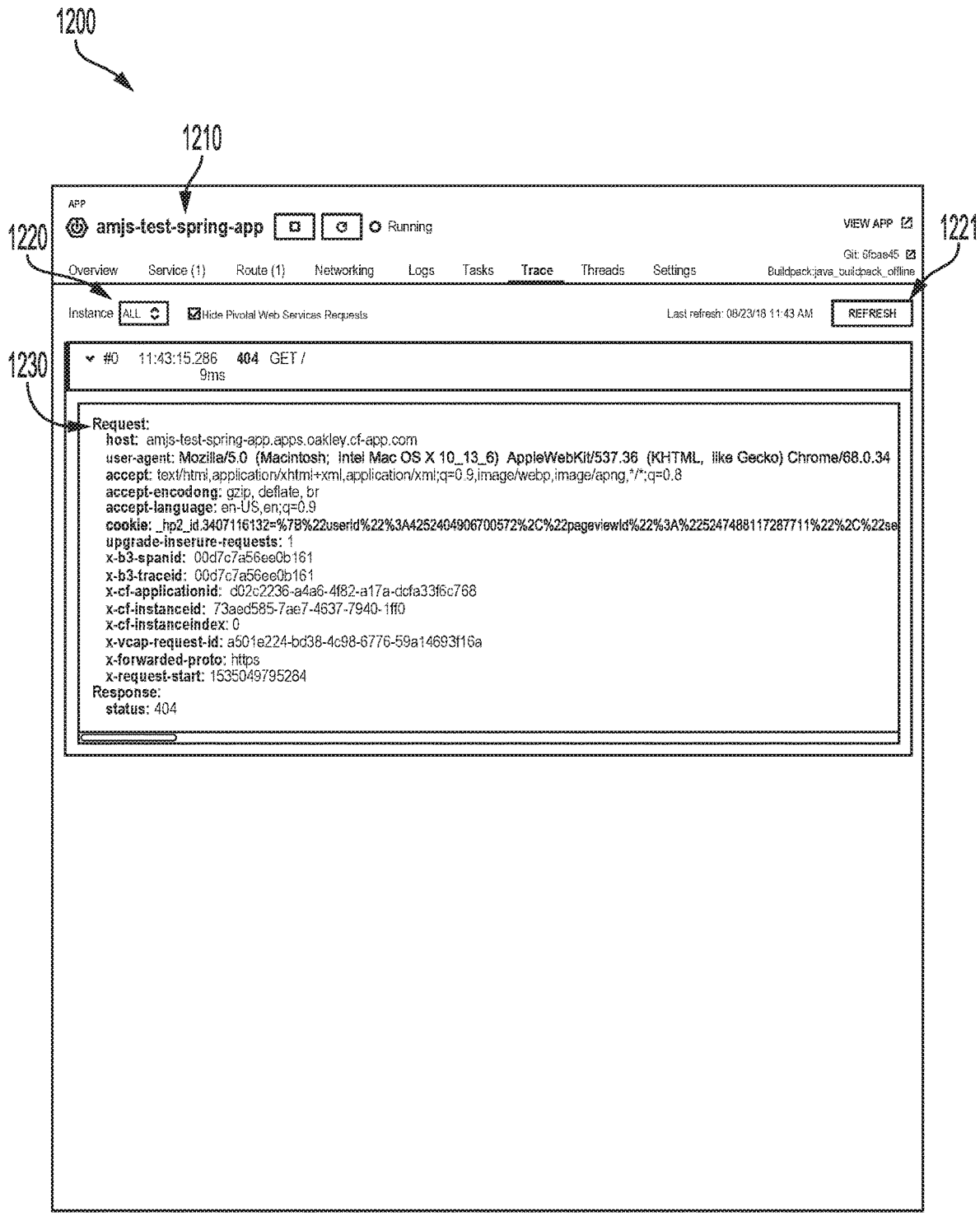
FIG. 12 depicts an example trace information user interface that presents requests received by an application.

FIG. 12 depicts an example trace information user interface 1200 that presents requests received by an application. The trace information user interface 1200 presents information about trace requests, e.g., HTTP requests, received by the application. The applications manager can obtain the trace information from a trace actuator of the application.

The trace information user interface 1200 includes the name of the application 1210 and trace information 1230 related to an HTTP request received by the application. The trace information 1230 includes the host associated with the request, the user agent associated with the request, the encoding and language of the request, a cookie associated with the request, identifiers and protocols associated with the request, and a response to the request.

The trace information user interface 1200 also includes an instances selection control 1220 that enables the user to view trace information for particular instances of the application. For example, the user can select the particular instance by entering the instance number in the instances selection control 1220 or incrementing or decrementing the instance number using the up and down arrows of the instances selection control 1220. In response, the applications manager can update the trace information 1230 to present trace information 1230 for the selected instance.

The trace information user interface 1200 also includes a refresh button 1221. The applications manager can refresh the trace information 1230 in response to user selection of the refresh button 1221. For example, the trace information user interface 1200 can request updated trace data from the trace actuator of the application or the instance of the application for which trace information is being presented in the trace information user interface 1200 when the refresh button 1221 is selected.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
receiving, by an applications manager component of an application platform in a cloud computing environment, a request by a user to access application information of an application deployed by an application framework installed on the application platform in the cloud computing environment;
obtaining, by the applications manager component from a user authentication module, a token for the user;
providing, by the applications manager component to the application framework, the token obtained for the user;
determining, by the application framework using the token obtained for the user, that the user has permission to access one or more actuators of the application deployed by the application framework;
in response, providing, by the application framework to the applications manager component, an indication that the user has permission to access the one or more actuators of the application deployed by the application framework;
providing, by the applications manager to the application framework, a request for data for a particular actuator of the one or more actuators that the user has permission to access;
generating, by the application framework, one or more data elements for the particular actuator and providing the one or more data elements for the particular actuator to the applications manager component;
generating, by the applications manager component, a user interface presentation that includes the one or more data elements for the particular actuator of the application deployed by the application framework.

Embodiment 2 is the method of embodiment 1, further comprising receiving the application to be deployed by the application framework installed on an application platform of a cloud computing environment, wherein the application has an associated configuration that specifies enabling one or more framework actuators for the application.

Embodiment 3 is the method of embodiment 1, wherein:
the particular actuator is a log level actuator for the application;
the one or more data elements for the particular actuator include a list of loggers for the log level actuator for the application; and
generating the user interface presentation comprises generating a presentation that includes the list of loggers and, for each logger a list of log levels that includes a set of log levels for the logger and that indicates a current log level for the logger.

Embodiment 4 is the method of embodiment 3, further comprising:
receiving a user input selecting a particular log level from the log level list for a particular logger; and
in response to receiving the user input, configuring the logger to log events of the application at the selected log level while the application is in a running state.

Embodiment 5 is the method of embodiment 1, wherein:

the particular actuator is a mappings actuator for the application;

the one or more data elements for the particular actuator include a list of one or more endpoints for the application and, for each endpoint, an identifier of a method that responds to requests for the endpoint; and generating the user interface presentation comprises generating a presentation that includes the one or more endpoints and, for each endpoint, the identifier of the method that responds to requests for the endpoint.

Embodiment 6 is the method of embodiment 1, wherein:
the particular actuator is a health check actuator for the application;

the one or more data elements for the particular actuator include data related to health of the application; and generating the user interface presentation comprises generating a presentation that includes the data related to the health of the application.

Embodiment 7 is the method of embodiment 6, wherein the data related to the health of the application comprises user-defined data defined by a user.

Embodiment 8 is the method of embodiment 1, wherein the particular actuator is a trace actuator for the application;

the one or more data elements for the particular actuator include data specifying one or more trace requests received by the application; and generating the user interface presentation comprises generating a presentation that includes the data specifying the one or more trace requests.

Embodiment 9 is the method of embodiment 1, wherein:
the particular actuator is a thread dump actuator;
the one or more data elements for the particular actuator comprises a list of threads currently running in the application; and generating the user interface presentation comprises generating a presentation that includes the list of threads currently running in the application.

Embodiment 10 is the method of embodiment 9, wherein the presentation includes a filtering control that enables a user to select from multiple instances of the application. The method further comprises:

receiving a user input selecting a particular instance of the application; and in response to receiving the user input, visually updating the list of threads in the presentation to only include threads currently running in the particular instance of the application.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a plurality of computers and one or more storage devices storing instructions that are operable, when executed by the plurality of computers, to cause the plurality of computers to perform operations comprising:

receiving, by an applications manager component of an application platform in a cloud computing environment, a first request by a user to access application information of an application deployed by an application framework installed on the application platform in the cloud computing environment;

obtaining, by the applications manager component from a user authentication module, a de-privileged token that indicates incomplete access rights the user has to access the application;

providing, by the applications manager component to the application framework, the de-privileged token obtained for the user;

determining, by the application framework using the de-privileged token obtained for the user, that the user has permission to access one or more actuators of the application, wherein the one or more actuators provide interfaces for at least one of monitoring or interacting with the application, the determining including:

initiating, by the application framework, a second request to the user authentication module for additional access rights for the user, wherein the second request comprises the de-privileged token and data identifying the application information to which the user requested access;

in response to the second request, receiving the additional access rights for the user comprising access rights to the application that were not indicated by the de-privileged token; and determining, by the application framework and based on the additional access rights, that the user has permission to access the one or more actuators;

in response to determining that the user has permission to access the one or more actuators, providing, by the application framework to the applications manager component, an indication that the user has permission to access the one or more actuators;

providing, by the applications manager to the application framework, a request for data for a particular actuator of the one or more actuators that the user has permission to access;

generating, by the application framework, one or more data elements for the particular actuator and providing the one or more data elements for the particular actuator to the applications manager component; and generating, by the applications manager component, a user interface presentation that includes the one or more data elements for the particular actuator of the application deployed by the application framework.

2. The system of claim 1, wherein the operations comprise:

receiving the application to be deployed by the application framework installed on an application platform of a cloud computing environment, wherein the application has an associated configuration that specifies enabling one or more framework actuators for the application.

3. The system of claim 1, wherein:

the particular actuator is a log level actuator for the application;

the one or more data elements for the particular actuator include a list of loggers for the log level actuator for the application; and generating the user interface presentation comprises generating a presentation that includes the list of loggers and, for each logger a list of log levels that includes a set of log levels for the logger and that indicates a current log level for the logger.

4. The system of claim 3, wherein the operations comprise:

receiving a user input selecting a particular log level from the log level list for a particular logger; and in response to receiving the user input, configuring the logger to log events of the application at the selected log level while the application is in a running state.

5. The system of claim 1, wherein:

the particular actuator is a mappings actuator for the application;

the one or more data elements for the particular actuator include a list of one or more endpoints for the application and, for each endpoint, an identifier of a method that responds to requests for the endpoint; and generating the user interface presentation comprises generating a presentation that includes the one or more endpoints and, for each endpoint, the identifier of the method that responds to requests for the endpoint.

6. The system of claim 1, wherein:

the particular actuator is a health check actuator for the application;

the one or more data elements for the particular actuator include data related to health of the application; and generating the user interface presentation comprises generating a presentation that includes the data related to the health of the application.

7. The system of claim 6, wherein the data related to the health of the application comprises user-defined data defined by a user.

8. The system of claim 1, wherein:

the particular actuator is a trace actuator for the application;

the one or more data elements for the particular actuator include data specifying one or more trace requests received by the application; and generating the user interface presentation comprises generating a presentation that includes the data specifying the one or more trace requests.

9. The system of claim 1, wherein:

the particular actuator is a thread dump actuator;

the one or more data elements for the particular actuator comprises a list of threads currently running in the application; and generating the user interface presentation comprises generating a presentation that includes the list of threads currently running in the application.

10. The system of claim 9, wherein the presentation includes a filtering control that enables a user to select from multiple instances of the application, the operations further comprising:

receiving a user input selecting a particular instance of the application; and in response to receiving the user input, visually updating the list of threads in the presentation to only include threads currently running in the particular instance of the application.

11. A computer-implemented method, comprising:

receiving, by an applications manager component of an application platform in a cloud computing environment, a first request by a user to access application information of an application deployed by an application framework installed on the application platform in the cloud computing environment;

obtaining, by the applications manager component from a user authentication module, a de-privileged token that indicates incomplete access rights the user has to access the application;

providing, by the applications manager component to the application framework, the de-privileged token obtained for the user;

determining, by the application framework using the de-privileged token obtained for the user, that the user has permission to access one or more actuators of the application, wherein the one or more actuators provide interfaces for at least one of monitoring or interacting with the application, the determining including:

initiating, by the application framework, a second request to the user authentication module for additional access rights for the user, wherein the second request comprises the de-privileged token and data identifying the application information to which the user requested access;

in response to the second request, receiving the additional access rights for the user comprising access rights to the application that were not indicated by the de-privileged token; and determining, by the application framework and based on the additional access rights, that the user has permission to access the one or more actuators;

in response to determining that the user has permission to access the one or more actuators, providing, by the application framework to the applications manager component, an indication that the user has permission to access the one or more actuators;

providing, by the applications manager to the application framework, a request for data for a particular actuator of the one or more actuators that the user has permission to access;

generating, by the application framework, one or more data elements for the particular actuator and providing the one or more data elements for the particular actuator to the applications manager component; and generating, by the applications manager component, a user interface presentation that includes the one or more data elements for the particular actuator of the application deployed by the application framework.

12. The method of claim 11, further comprising:
receiving the application to be deployed by the application framework installed on an application platform of a cloud computing environment, wherein the application has an associated configuration that specifies enabling one or more framework actuators for the application.

13. The method of claim 11, wherein:
the particular actuator is a log level actuator for the application;
the one or more data elements for the particular actuator include a list of loggers for the log level actuator for the application; and
generating the user interface presentation comprises generating a presentation that includes the list of loggers and, for each logger a list of log levels that includes a set of log levels for the logger and that indicates a current log level for the logger.

14. The method of claim 13, further comprising:
receiving a user input selecting a particular log level from the log level list for a particular logger; and
in response to receiving the user input, configuring the logger to log events of the application at the selected log level while the application is in a running state.

15. The method of claim 11, wherein:
the particular actuator is a mappings actuator for the application;
the one or more data elements for the particular actuator include a list of one or more endpoints for the application and, for each endpoint, an identifier of a method that responds to requests for the endpoint; and
generating the user interface presentation comprises generating a presentation that includes the one or more endpoints and, for each endpoint, the identifier of the method that responds to requests for the endpoint.

16. The method of claim 11, wherein:
the particular actuator is a health check actuator for the application;
the one or more data elements for the particular actuator include data related to health of the application; and
generating the user interface presentation comprises generating a presentation that includes the data related to the health of the application.

17. The method of claim 16, wherein the data related to the health of the application comprises user-defined data defined by a user.

18. The method of claim 11, wherein:
the particular actuator is a trace actuator for the application;
the one or more data elements for the particular actuator include data specifying one or more trace requests received by the application; and
generating the user interface presentation comprises generating a presentation that includes the data specifying the one or more trace requests.

19. One or more non-transitory computer storage media encoded with computer program instructions that when executed by a distributed system comprising a plurality of computers cause the plurality of computers to perform operations comprising:
receiving, by an applications manager component of an application platform in a cloud computing environment, a first request by a user to access application information of an application deployed by an application framework installed on the application platform in the cloud computing environment;
obtaining, by the applications manager component from a user authentication module, a de-privileged token that indicates incomplete access rights the user has to access the application;
providing, by the applications manager component to the application framework, the de-privileged token obtained for the user;
determining, by the application framework using the de-privileged token obtained for the user, that the user has permission to access one or more actuators of the application, wherein the one or more actuators provide interfaces for at least one of monitoring or interacting with the application, the determining including:
initiating, by the application framework, a second request to the user authentication module for additional access rights for the user, wherein the second request comprises the de-privileged token and data identifying the application information to which the user requested access;
in response to the second request, receiving the additional access rights for the user comprising access rights to the application that were not indicated by the de-privileged token; and
determining, by the application framework and based on the additional access rights, that the user has permission to access the one or more actuators;
in response to determining that the user has permission to access the one or more actuators, providing, by the application framework to the applications manager component, an indication that the user has permission to access the one or more actuators;
providing, by the applications manager to the application framework, a request for data for a particular actuator of the one or more actuators that the user has permission to access;
generating, by the application framework, one or more data elements for the particular actuator and providing the one or more data elements for the particular actuator to the applications manager component; and
generating, by the applications manager component, a user interface presentation that includes the one or more data elements for the particular actuator of the application deployed by the application framework.

20. The system of claim 1, wherein initiating, by the application framework, the second request to the user authentication module for additional access rights for the user comprises sending the second request to a cloud controller, wherein the cloud controller sends, to the user authentication module, a third request to enhance the de-privileged token and receives, from the user authentication module, the additional access rights in response to the third request.

* * * * *